3,119,866
STABILIZED HYDROXYUREA
Frederick Y. Wiselogle, North Brunswick, N.J., assignor to Olin Mathieson Chemical Corporation, New York, N.Y., a corporation of Virginia
No Drawing. Filed Apr. 12, 1961, Ser. No. 102,381
6 Claims. (Cl. 260—553)

This invention relates to new compositions of matter and more specifically to mixtures of hydroxyurea and a stabilizer therefor.

Hydroxyurea is a known compound, useful among other purposes as a bactericidal agent. Unfortunately, the compound is relatively unstable and tends to decompose even when stored in the dry state [Kofod et al., Acta Chemica Scandinavica, 8, 485–493 (1954)]. It has been found, however, that when hydroxyurea is admixed with a substance which buffers an aqueous solution thereof in the pH range of about 3 to about 7 (optimally about 5.5 to about 6.5), as a stabilizing agent, the resulting mixture is stable indefinitely.

Among the suitable substances which may be used as stabilizers in the compositions of this invention are those compounds or mixtures of compounds which are known to form, upon the addition of water, an aqueous buffer solution having a pH of about 3 to about 7. If the hydroxyurea is to be used for a pharmaceutical purpose, the stabilizing substance of course should be non-toxic. Moreover, if the hydroxyurea is to be administered parenterally, the stabilizing substance should be parenterally acceptable. Such substances include single compounds, such as primary potassium citrate and disodium hydrogen citrate; and mixtures of compounds, such as citric acid and disodium phosphate and potassium acid phosphate and disodium phosphate.

The stabilizing substance can be present in any proportion but preferably is present in a weight to weight ratio of about 5% to about 15% of the hydroxyurea. The compositions of this invention can be prepared by simply intimately mixing the hydroxyurea, in particulate form, with the stabilizing substance, in particulate form; but preferably by dissolving the buffer and hydroxyurea in water and evaporating off the water. Optimally the compositions of this invention are prepared by dissolving the buffer and hydroxyurea in water, freezing the resulting solution and lyophilizing to yield a substantially dry mixture of the buffer and hydroxyurea.

The following examples illustrate the invention:

*Example 1*

3.5 g. of citric acid and 9.0 g. of disodium phosphate are dissolved in 900 ml. of water. 125.0 g. of hydroxyurea is then added and the resulting mixture is stirred until the hydroxyurea has dissolved. The resulting solution has a pH of about 6.0. The solution is then frozen at once at $-30°$ C. and lyophilized at 50–100 microns vacuum. The resulting mixture is stable indefinitely.

*Example 2*

To a solution of 10 g. of disodium hydrogen citrate in 100 ml. of water there is added 200 g. of hydroxyurea and the mixture is stirred until complete solution is obtained. The solution, which has a pH of about 5.0, is filtered, frozen at $-30°$ C. and lyophilized at 50–100 microns vacuum. The resulting solid mixture is stable indefinitely.

This invention may be variously otherwise embodied within the scope of the appended claims.

What is claimed is:
1. As a dry, stable composition a mixture of hydroxyurea and a stabilizer therefor, said stabilizer being a substance which buffers an aqueous solution thereof in the pH range of about 5.5 to about 6.5.
2. As a dry, stable composition the mixture of claim 1 wherein the stabilizer is present in a weight to weight ratio of about 3% to about 15% of the hydroxyurea.
3. As a dry, stable composition a mixture of hydroxyurea and a stabilizer therefor, said stabilizer being a mixture of citric acid and disodium phosphate.
4. A process for the production of a dry, stable composition which comprises preparing an aqueous solution of hydroxyurea; adjusting the pH of said solution from about 5.5 to about 6.5 by the incorporation of from about 3 to about 15% by weight of the hydroxyurea of a stabilizer; freezing said adjusted solution; and lyophilizing said frozen solution under reduced pressure to obtain a dry product.
5. As a dry, stable composition, a mixture of hydroxyurea and a stabilizer therefor, said stabilizer being a substance which buffers an aqueous solution thereof in the pH range of about 5.0 to about 6.5.
6. The mixture of claim 5 wherein the stabilizer is disodium hydrogen citrate.

References Cited in the file of this patent

Britton: Hydrogen Ions (D. Van Nostrand, 1929), pages 180–2.
Weissberger: Technique of Organic Chemistry, volume III (1950), pages 630–3.
Lyman et al.: American Pharmacy (fourth edition, 1955), pages 54–5.
Kofod: Octa. Chim. Scand., volume 9, part I (1955), pages 455–70; pages 455–7, 459 and pages 468–9 are particularly relied on.
Kofod: Acta. Chem. Scand., volume 9, part II (1955) pages 1575–86; pages 1579 and 1583 are particularly relied on.